Fig. 1.

INVENTOR.
RALPH C. SCHLICHTIG
BY
ATTORNEY

Fig. 2.

INVENTOR.
RALPH C. SCHLICHTIG
BY K. W. Thomas
ATTORNEY

United States Patent Office 3,199,310
Patented Aug. 10, 1965

3,199,310
EJECTOR TYPE REFRIGERATION SYSTEM
Ralph C. Schlichtig, 11212 3rd S., Seattle, Wash.
Filed Jan. 24, 1963, Ser. No. 253,571
6 Claims. (Cl. 62—500)

This invention relates to heat transfer apparatus therefore, and more particularly to ejector type refrigeration systems or heat pump systems employing heat as a source of power.

Heretofore many types of refrigeration or heat pump systems have been provided. The various types are determined by the grade of energy required to power them. For instance, one type, the mechanical compressor refrigeration system requires mechanical or electrical energy to power it, the mechanical or electrical energy being the highest grade of energy and is reversibly convertible. However, in many instances high grade energy is not economical to use for powering refrigeration systems. Thus, another type of refrigeration system currently being used is the absorption type refrigeration system which is powered from heat energy which, however, must be at a fairly high temperature level. Still another type of refrigeration system is the ejector type refrigeration system which is likewise powered from heat energy at a fairly high temperature level. Thus, from the foregoing it can be realized it would be desirable to provide a refrigeration system which could be powered by heat energy at a lower temperature level than required by the present absorption type and ejector type refrigeration systems.

The absorption type refrigeration system, which as hereinbefore mentioned is powered from heat energy which must be at a relative high temperature level, also has several other disadvantages. For instance, the coefficient of performance is relatively low. The coefficient of performance of a refrigeration system is defined as the ratio of effective refrigeration to the total heat energy input. In addition, such an absorption type refrigeration system is bulky and commonly requires working mediums which are corrosive or flammable.

Prior art ejector type refrigeration systems, which also are powered from heat energy at a relatively high temperature level, likewise have several disadvantages. One such disadvantage, which has rendered the ejector type refrigeration system noncompetitive with the absorption type refrigeration system, is the very low coefficient of performance of the ejector type refrigeration system. Such prior ejector type refrigeration systems have attempted to improve the coefficient of performance by utilizing two working fluids of different molecular weight. However, even in such attempts the prior art ejector type systems were such that working fluids having usually desirable properties could not be used.

Therefore, an object of this invention is to provide a heat pump system which has a higher coefficient of performance and higher efficiency than other known heat powered heat pump systems.

Another object of this invention is to provide a thermally powered heat pump or refrigeration system that is capable of operating from a relatively small temperature difference between the heat source and the ejected heat at the condenser.

Still another object of this invention is to provide a thermally powered heat pump or refrigeration system that can be powered from the heat flow from the temperature level of ambient summer air to the temperature level achievable by evaporating water into ambient air.

A further object of this invention is to provide a thermally powered heat pump or refrigeration system that can satisfactorily operate with working fluids that are noncorrosive, nonflammable and nontoxic such as fluorocarbon compounds.

Another object of this invention is to provide a thermally powered heat pump or refrigeration system capable of operating with a boiler at a temperature obtainable from summer ambient air.

A further object of this invention is to provide a thermally powered heat pump or refrigeration system which has incorporated therein at least one ejector and in which the excess energy of the power fluid discharged from the ejector is effectively utilized to increase the efficiency of the system.

A still further object of this invention is to provide a self-contained heat pump or refrigeration system suitable for use on transportation vehicles.

Another object of this invention is to provide a thermally powered ejector type heat pump or refrigeration system which operates with two fluids which do not need to be restricted to nonmiscible fluids, thus permitting the selection of working fluids with optimum properties.

Still another object of this invention is to provide a thermally powered heat pump or refrigeration system which has the additional well known common advantages of prior art ejector type heat pumps or refrigeration systems such as capability of operating with two different fluids, capability of operating on gaseous or liquid fuels, minimum maintenance, relatively small size for a given output, and relatively low cost of manufacture.

A further object of this invention is to provide a thermally powered ejector type heat pump or refrigeration system which is so constructed as to be capable of employing a power fluid of high molecular weight and a refrigerant fluid which are miscible so as to effect a highly efficient heat pump or refrigeration system.

Other objects of this invention will become apparent from the following description when taken in conjunction with the accompanying drawings in which.

Figure 1:
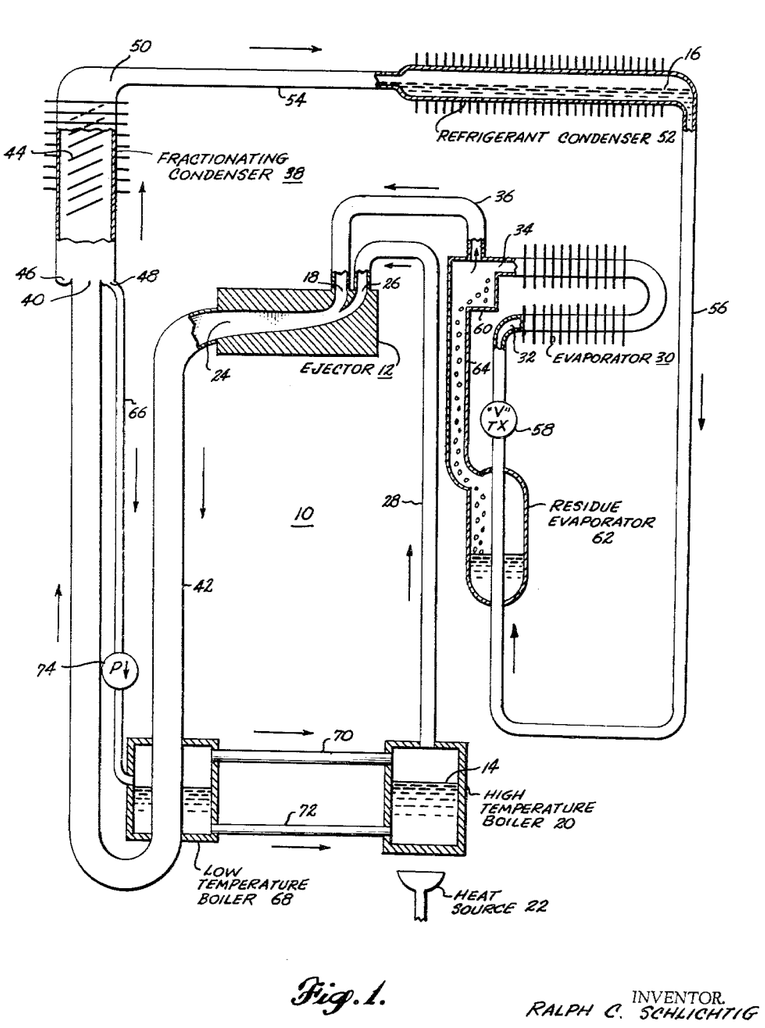
FIG. 1 is a flow diagram of an ejector type refrigeration system illustrating one embodiment of the teachings of this invention in which a single ejector is used in a two fluid system and the excess energy of the power fluid discharged from the ejector is in the form of heat energy and a large portion of this excess energy is recovered by disposing a low temperature boiler in heat transfer relationship with respect to a conduit that is operatively associated with the discharge portion of the ejector.

Referring to FIG. 1 there is shown a two fluid ejector type refrigeration system 10 illustrating one embodiment of the teachings of this invention in which a single ejector 12 is employed and in which the power liquid 14 has a greater molecular weight and boiling point than the refrigerant liquid 16 and the two liquids 14 and 16 are separated by fractional distillation and condensation. The refrigeration system 10 is such that it can employ a power liquid and a refrigerant liquid that are mutually miscible. For example, a suitable power liquid and refrigerant liquid that are mutually miscible are cyclic-octofluoro-butane (cyclic $C_4F_8$) and 1,1 difluoroethane, respectively which have the following respective molecular weights 200 and 66, and the following respective boiling points —6 degrees centigrade and —24 degrees centigrade. However, the refrigeration system 10 is such that it can also operate with a power liquid and a refrigerant liquid that are only partially miscible. An example of such a power liquid and a refrigerant liquid is butyl alcohol and water, respectively. However, the refrigerant liquid of such a partially miscible combination has the undesirable property of excessively depressing the suction pressure at the refrigerant inlet 18 with respect to the discharge pressure of the ejector 12, thus decreasing the efficiency of the ejector 12 and thereby decreasing the efficiency of the overall refrigeration system 10. Such excessive depressing of the suction pressure necessarily also occurs when a well known gravity means (not shown) is used in a refrigeration system for effecting separation of the power fluid and the refrigerant fluid after condensation takes place. It has been discovered that by using mutually miscible power and refrigerant liquids, such as cyclic-octofluoro-butane and 1,1 difluoroethane, in a refrigeration system, the undesirable feature of such excessive depressing of the suction pressure at the refrigerant inlet of the ejector can be avoided. For example, with water as the refrigerant fluid the pressure ratio between the pressure at refrigerant inlet 18 and the discharge pressure of the ejector 12 is 1 to 2 for a given temperature difference between the temperature of the refrigerant vapor supplied to the refrigerant inlet 18 and the condensing temperature of the refrigerant vapor discharged from the ejector 12. On the other hand, with 1,1 difluoroethane as the refrigerant fluid under the same conditions of temperature difference the corresponding pressure ratio is 2 to 3. Thus, it can be realized that when 1,1 difluoroethane is used as the refrigerant vapor instead of water less work is required by the ejector 12 in compressing the refrigerant vapor, thereby improving the thermal efficiency of the ejector 12.

As hereinbefore mentioned, the refrigeration system 10 can operate with the aforementioned miscible liquids and can effectively separate them. In addition, the refrigeration system 10 has the ability of utilizing the excess energy or superheat existing in the discharge vapor from the ejector 12 for vaporizing a more volitile portion dissolved in the power liquid, thus conserving source heat and thereby still further increasing the system efficiency.

The refrigeration system 10 includes a high temperature boiler 20 for vaporizing the power liquid 14 disposed within the boiler 20. In practice, the high temperature boiler can be heated from any suitable heat source 22. The ejector 12, which will be described in greater detail hereinafter, is a preferred ejector and is the same as the ejector shown in FIG. 3 of United States patent application Serial No. 234,816, filed November 1, 1962, by the applicant herein, and entitled "Ejectors."

In general, the ejector 12 comprises the refrigerant inlet 18, a discharge portion 24, and a power inlet 26 for receiving the vaporized power liquid from the high temperature boiler 20 through a conduit 28. A conventional finned evaporator 30, having an inlet 32 and an outlet 34, is provided for evaporating the refrigerant liquid 16. In order that the ejector 12 can effectively pump the refrigerant vapor from the evaporator 30, the outlet 34 of the evaporator 30 is in communication with the refrigerant inlet 18 of the ejector 12 through a conduit 36. The refrigeration system 10 also includes a condensing region, namely a fractionating condenser 38 having an inlet 40 for receiving the mixed refrigerant vapor and vaporized power fluid from the discharge portion 24 of the ejector 12 through a conduit 42, separating surfaces 44 for separating the refrigerant vapor from the vaporizer power fluid by condensing the vaporized power fluid, a collector 46 for collecting the condensed power fluid, a liquid outlet 48, and a vapor outlet 50.

Another condensing region, namely a conventional air cooled refrigerant condenser 52 is connected to the fractionating condenser 38 by means of a conduit 54 so as to condense the refrigerant vapor received from the fractionating condenser 38. A conduit 56 is interconnected between the refrigerant condenser 52 and the evaporator 30 for returning the condensed refrigerant to the evaporator 30. For the purpose of regulating the flow of liquir from the refrigerant condenser 52 to the evaporator 30, a conventional thermal regulating valve 58 is disposed in the conduit 56. An overflow sump 60 is provided for receiving residue contaminator liquid which includes the unevaporated power fluid which entered the evaporator 30 dissolved in the refrigerant liquid 16 and a residue evaporator 62 is disposed in thermal contact with the conduit 56 for receiving the contaminator liquid from the overflow sump 60 through a conduit 64 so as to evaporate the residue contaminator liquid.

In order to return the condensed power fluid and any dissolved refrigerant from the collector 46 of the fractionating condenser 38 to a low temperature boiler 68, conduit means 66 is provided. The low temperature boiler 68 is disposed in thermal contact with the conduit 42 so as to transfer the superheat of the mixed vapors discharged from the ejector 12 to the liquid received from the conduit means 66, to thereby evaporate any refrigerant dissolved in such liquid and discharge the resulting refrigerant vapor through a conduit 70 so that it adds to the vaporized power fluid within the high temperature boiler 20. The power fluid remaining in the low temperature boiler 68 is delivered to the high temperature boiler 20 by means of a conduit 72, as boilers 68 and 20 are at the same pressure.

The operation of the refrigeration system 10 will now be described. Sufficient heat is applied to the high temperature boiler 20 by means of the heat source 22 to effect a continuous vaporization of the power liquid 14 disposed within the boiler 20 to thereby produce power vapor at the system's highest vapor pressure, $P_h$. This pressure must be sufficiently high so as to operate the ejector 12. The power vapor is directed to the power inlet 26 of the ejector 12 by means of the conduit 28. Ejector 12, acting as a pump, effects a greatly reduced pressure in the conduit 36 so that refrigerant vapor is withdrawn from the evaporator 30 at a pressure $P_1$ which is the saturation pressure of the refrigerant liquid 16 at the temperature prevailing within the evaporator 30. Evaporation at this reduced pressure $P_1$ keeps the evaporator 30 cold. As will be explained more fully hereinafter, some power fluid enters the evaporator 30 dissolved in the refrigerant liquid 16. Since the refrigerant liquid 16 has a lower boiling point than the power fluid there usually remains in the evaporator 30 after the refrigerant liquid 16 has evaporated some liquid residue or contaminator liquid which includes a large fraction of the power fluid. This contaminator liquid spills over into the overflow sump 60, from which it is delivered by gravity to the residue evaporator 62. Here the contaminator liquid is evaporated at a higher temperature than the temperature within the evaporator 30 by sensible heat from liquid within the conduit 56. The combined vapor from both the evaporators 30 and 62 is induced to flow through the conduit 36 to the refrigerant inlet 18 of the ejector 12 by the action of the power vapor flowing through the ejector 12 as will be explained more fully hereinafter. In the ejector 12 the combined vapor from the evaporators 30 and 62 is compressed and mixed with the power vapor in the discharge portion 24 of the ejector 12 and the vapor mixture is delivered from the discharge portion 24 at a pressure $P_2$ which is higher than $P_1$. The pressure $P_2$ is essentially the saturation pressure of the refrigerant vapor that condenses in the refrigerant condenser 52.

The vapor mixture delivered from the discharge portion 24 of the ejector 12 flows through the conduit 42 to the fractionating condenser 38 where most of the power vapor of greater molecular weight condenses out on flowing into contact with the separating surfaces 44 and in so doing gives up heat. The condensed power vapor flows into the collector 46 and from thence the condensed power vapor and any dissolved refrigerant flows through the conduit 66 to the low temperature boiler 68. If the positioning of the components of the refrigeration system 10 are such as to permit gravity flow the condensed power vapor will flow by gravity from the collector 46 to the low temperature boiler 68, otherwise a pump 74 is provided for effecting such flow. Superheat of the vapors flowing through the conduit 42 is transferred to the liquid within the low temperature boiler 68, to thus evaporate any refrigerant dissolved in such liquid. The resulting refrigerant vapor is then discharged through the conduit 70 so that it adds to the vaporized power fluid within the high temperature boiler 20. Thus, a large portion of the excess energy of the power vapor discharged from the ejector 12 is recovered. The power fluid remaining in the low temperature boiler 68 is delivered to the high temperature boiler 20 by means of the conduit 72.

A portion of the refrigerant vapor entering the fractionating condenser 38 is condensed upon flowing into contact with the separating surfaces 44, however, it is not effectively condensed since substantially all of it is immediately revaporized due to the heat given up when the power vapor is condensed within the fractionating condenser 38. Thus, the refrigerant vapor leaves the fractionating condenser 38 by way of the vapor outlet 50 as fairly pure refrigerant vapor and flows through the conduit 54 to the refrigerant condenser 52 where it is effectively condensed. As this condensed refrigerant vapor is at pressure $P_2$ which is higher than the pressure $P_1$ it and any contaminator power fluid which entered the refrigerant condenser 52 from the fractionating condenser 38 will readily flow from the refrigerant condenser 52 through the conduit 56 to the evaporator 30. The hereinbefore described cycle of operation is then repeated.

The hereinbefore described single stage operation is made effective by using a power liquid 14 having a low specific heat of vaporization as compared to the specific heat of vaporization of the refrigerant liquid 16 and thus by using a power liquid 14 having a greater molecular weight than the refrigerant liquid 16 and by separating the vaporized power fluid from the refrigerant vapor by effectively condensing the vaporized power fluid and the refrigerant vapor to separate condensing regions so that the vapor pressure of the power fluid is not added to the vapor pressure of the refrigerant as is normally the case when two liquids are mixed. Thus, the back pressure on the output of the ejector 12 is minimized by being restricted primarily to the vapor pressure of the refrigerant. The operation is further improved by using an ejector 12 which can efficiently operate with fairly large ratios of $P_2$ to $P_1$ from unusually small ratios of $P_h$ to $P_1$. The proper choice of power liquid 14 and refrigerant liquid 16 so that the ratio of the pressure $P_h$ of the power vapor to the pressure $P_1$ of the refrigerant vapor is no greater than 8 also improves the operation of the refrigeration system 10. The reason for holding the pressure ratio of $P_h$ to $P_1$ to less than 8 to obtain this advantage is that the ejector 12 can then be designed to operate with a more efficient converging power fluid passageway. If pressure ratios of $P_h$ to $P_1$ are much greater than 8, the less efficient converging-diverging power fluid passageway must be employed. Further, by using a power liquid 14 having a greater molecular weight than the refrigerant liquid 16 the velocity difference between the power vapor and the refrigerant vapor while in contact in the ejector 12 is decreased to thereby decrease energy loss in the ejector 12 thus improving the efficiency of the refrigeration system 10.

Figure 2:
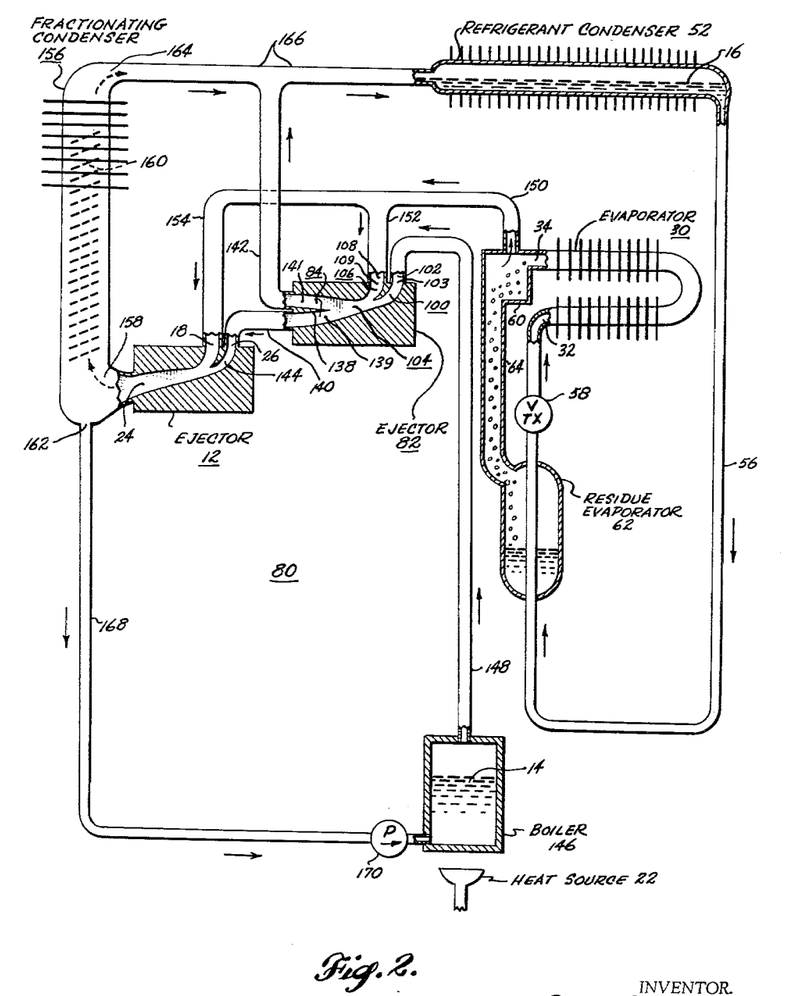
FIG. 2 is a flow diagram of a two fluid ejector type refrigeration system illustrating another embodiment of the teachings of this invention in which the separation function of a first ejector is employed in order that the same power fluid can be used to power a second ejector so that the excess energy of the power fluid discharged from the first ejector in the form of pressure is effectively utilized in having the same power fluid flow through the second ejector.

Referring to FIG. 2 there is shown a two fluid ejector type refrigeration system 80 illustrating another embodiment of the teachings of this invention in which the separation function of a first ejector 82 is employed in order that the same power fluid can be used to power the second ejector 12 so that the excess energy of the power fluid discharged from the ejector 82 in the form of pressure is effectively utilized in having the same power fluid flow through the ejector 12. Like components of FIGS. 1 and 2 have been given the same reference characters.

In the embodiment of FIG. 2 the power liquid 14 has a greater molecular weight and boiling point than the refrigerant liquid 16 and the refrigeration system 80 is such that it can employ a power liquid and a refrigerant liquid that are mutually miscible. However, the refrigeration system 80 is such that it can also operate with a power liquid and a refrigerant liquid that are only partially miscible. The same power liquids and refrigerant liquids set forth with reference to the embodiment of FIG. 1 can be used with the embodiment of FIG. 2.

Figure 3:
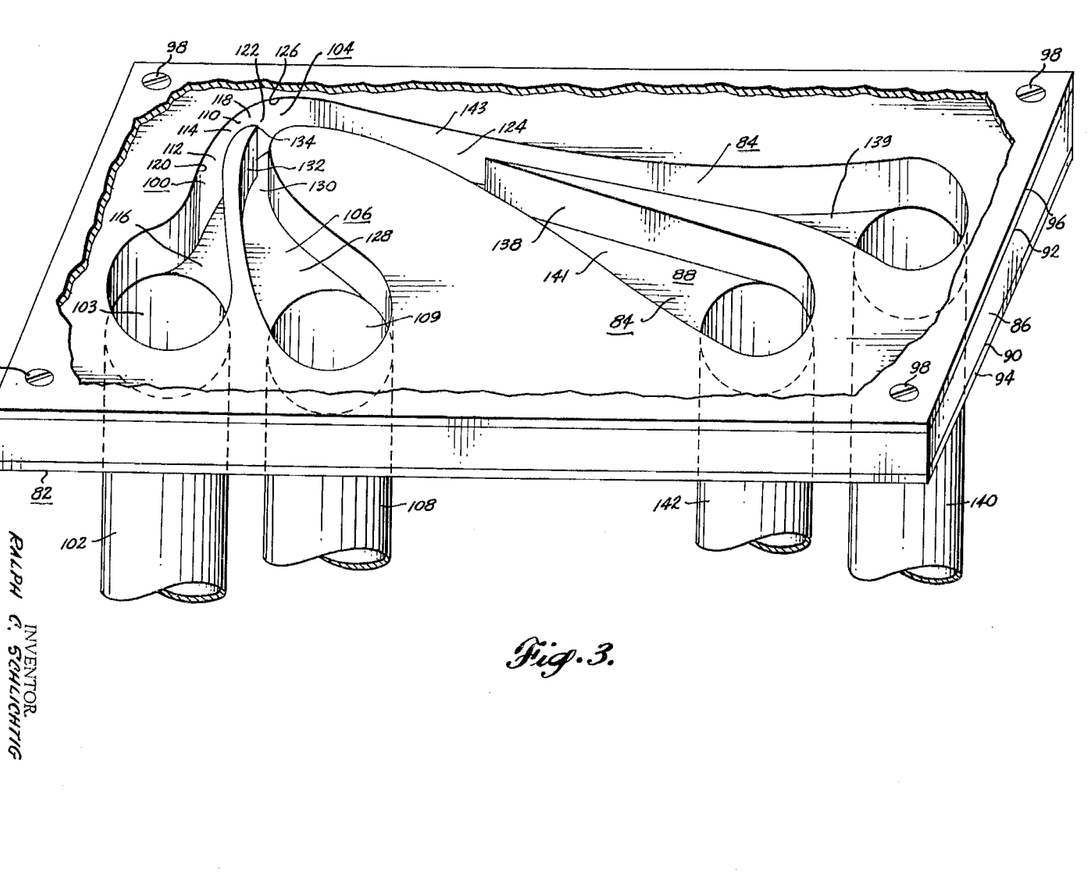
FIG. 3 is a detailed and partly cut away illustration of the ejector of FIG. 4 and the first ejector of FIG. 2 in which the ejector of FIG. 3 is shown in a rotated orientation.

The ejector 82, which is similar to the ejector of FIG. 4 of the aforementioned patent application Serial No. 234,816 except at the discharge portion 84, will now be described. In general, the ejector 82 includes a median plate 86 having an opening 88 of predetermined shape which extends from a face 90 of median plate 86 through to the opposite face 92 of the median plate 86; a cover plate 94 disposed against the face 90 of the median plate 86; a cover plate 96 all of the surfaces of which are continuous except for a plurality of openings for a plurality of screws 98, the cover plate 96 being disposed against the face 92 of the median plate 86; and the plurality of screws 98 for maintaining the cover plates 94 and 96 in fixed relationship with respect to the median plate 86, so that the combination of the median plate 86 and the cover plates 94 and 96 define a system of interconnected passageways including a curved converging-diverging power stream passageway 100 for receiving power vapor through a power inlet connection 102 having an inlet 103, a curve accelerator compartment 104, a curved converging secondary passageway 106 for receiving refrigerant vapor through a refrigerant inlet connection 108 having an inlet 109, and the discharge portion 84. The power inlet connection 102 is disposed in an opening in the cover plate 94 and is suitably secured to the cover plate 94. The refrigerant inlet connection 108 is disposed in another opening in the cover plate 94 and is suitably secured to the cover plate 94.

The curve converging-diverging power stream passageway 100 has a divering discharge end 110 and a converging receiving end 112 for receiving the power vapor. Thus, the converging-diverging power stream passageway 100 has a restricted throat 114 and is so shaped as to accelerate the power vapor within the curved converging-diverging power stream passageway 100 and create an energy gradient in the accelerated power vapor in direction transverse to the flow direction of the accelerated power vapor and a pressure gradient in the accelerated power vapor in direction transverse to the flow direction of the accelerated power vapor, so that a portion of the accelerated power vapor has the greatest total unit pressure energy and unit kinetic energy. The power stream passageway 100 is curved in direction from its receiving end 116 to its discharge end 118 and is bounded in part by a curved outer boundary surface 120 which curves in direction from the receiving end 116 of the power stream passageway 100 to the discharge end 118, whereby centrifugal force is set up within the accelerated power vapor within the power stream pasageway 100 to thereby effect an energy gradient in the accelerated power vapor in direction transverse to the flow direction of the accelerated power vapor and toward the curved outer boundary surface 120 and a pressure gradient in the accelerated power vapor in direction transverse to the flow direction of the accelerated power vapor and toward the curved outer boundary surface 120, so that the portion of the accelerated power vapor flowing along the curved outer boundary surface 120 of the power stream passageway 100 has the greatest total unit pressure energy and unit kinetric energy.

The curved accelerator compartment 104 has a receiving end 122, which is in communication with the discharge end 118 of the power stream passageway 100, and a discharge end 124. The curved accelerator compartment 104 is curved in direction from its receiving end 122 to its discharge end 124 and is bounded in part by a curved outer boundary surface 126 which likewise curves in direction from the receiving end 122 of the curved accelerator compartment 104 to the discharge end 124, the curved outer bounady surface 126 forming a continuous curve with the curved outer boundary surface 120 of the converging-diverging power stream passageway 100. The curvature of the curved outer boundary surface 126 has the same algebraic sign as the curvature of the curved outer boundary surface 120. The curved convering-diverging power stream passageway 100 is so positioned as to direct the accelerated power vapor through the receiving end 122 of the curved accelerator compartment 104 in such a way that the portion of the accelerated power vapor of greatest total unit pressure energy and unit kinetic energy flows continuously along the curved outer boundary surface 126 of the curved accelerator compartment 104, whereby centrifugal force maintains within the accelerated power vapor within the curved accelerator compartment 104 a pressure gradient and an energy gradient in direction toward the curved outer boundary surface 126 such that the total unit pressure energy and unit kinetic energy of the accelerated power vapor is greatest along the curved outer boundary surface 126. Thus, the region of lowest pressure within the accelerated power vapor within the curved accelerator compartment 104 is at a region which is farthest away from the curved outer boundary surface 126.

The curved converging secondary passageway 106 has a receiving end 128 in communication with the refrigerant inlet 109 and a discharge end 130 in communication with the receiving end 122 of the curved accelerator compartment 104. In operation, the refrigerant vapor within the curved converging secondary passageway 106 is accelerated by the power vapor which is within the curved accelerator compartment 104. The curved converging secondary passageway 106 is so shaped as to accelerate the refrigerant vapor within the curved converging secondary passageway 106 and create an energy gradient in the accelerated refrigerant vapor in direction transverse to the flow direction of the accelerated refrigerant vapor and create a pressure gradient in the accelerated refrigerant vapor in direction transverse to the flow direction of the accelerated refrigerant vapor, so that a portion of the accelerated refrigerant vapor has the greatest total unit pressure energy and unit kinetic energy. In particular, in order to accelerate the refrigerant vapor within the secondary passageway 106, the secondary passageway 106 converges from its receiving end 128 to its discharge end 130. The secondary passageway 106 curves in direction in direction from its receiving end 128 to its discharge end 130 and is bounded in part by a curved boundary surface 132 which likewise curves in direction from the receiving end 128 to a point of confluence 134 between the discharge end 130 of the secondary passageway 106 and the discharge end 118 of the converging-diverging power stream passageway 100, so as to create an energy gradient in the accelerated refrigerant vapor in direction transverse to the flow direction of the accelerated refrigerant vapor and create a pressure gradient in the accelerated refrigerant vapor in direction transverse to the flow direction of the accelerated refrigerant vapor, so that the portion of the accelerated refrigerant vapor flowing along the curved boundary surface 132 of the curved converging secondary passageway 106 has the greatest total unit pressure energy and unit kinetic energy. As shown, the curvature of the curved outer boundary surface 132 of the curved converging secondary passageway 106 has the same algebraic sign as the curvature of the curved outer boundary surface 120 of the converging-diverging power stream passageway 100. The curved converging secondary passageway 106 is so positioned as to direct the accelerated refrigerant vapor into the curved accelerator compartment 104 in such a way that the portion of the accelerated refrigerant vapor of greatest total unit pressure energy and unit kinetric energy flows in contact with the accelerated power vapor within the curved accelerator compartment 104, whereby the accelerated refrigerant vapor is further accelerated.

Referring in particular to the discharge portion 84, the discharge portion 84 is in communication with the discharge end 124 of the curved accelerator compartment 104 for receiving from the curved accelerator compartment 104 the accelerated power vapor and the accelerated refrigerant vapor. A wedge shaped separating member 138 is operatively associated with the discharge portion 84 for separating the power vapor from the refrigerant vapor so that the power vapor flows out through a discharge passageway 139 and a discharge conduit 140 which is disposed in an opening in the cover plate 94 and suitably secured to the cover plate 94 and so that the refrigerant vapor flows out through a discharge passageway 141 and a discharge conduit 142 which is disposed in an opening in the cover plate 94 and suitably secured to the cover plate 94.

The separation between the power vapor and the refrigerant vapor within the curved accelerator compartment 104 is maintained by centrifugal action by which the more dense power vapor is held to the outer portion 143 of the curved accelerator compartment 104. Thus, the power vapor is directed to discharge passageway 139 of the discharge portion 84 while the refrigerant vapor is directed to the discharge passageway 141 of the discharge portion 84.

The ejector 12 of FIGS. 1 and 2 is similar to the ejector 82 in configuration and operation except that its power stream passageway is just converging instead of converging-diverging as is the power stream passageway 100 of FIG. 3. In addition the longitudinal axis of the discharge portion or passageway 24 of the ejector 12 is curved and goes through zero. Since the curvature of this longitudinal axis goes through zero the flow path of the partially mixed power vapor and refrigerant vapor is changed so that the total unit pressure energy and unit kinetic energy of the partially mixed power vapor and refrigerant vapor approaches a uniform value at all points in direction transverse to the flow direction of the partially mixed power vapor and refrigerant vapor.

The refrigeration system 80 includes a boiler 146 for vaporizing the power liquid 14 which power vapor is directed to the power inlet 103 of the ejector 82 through a conduit 143. Refrigerant vapor and any dissolved power fluid from the evaporator 30 is simultaneously directed to the refrigerant inlet 109 of the ejector 82 and to the refrigerant inlet 18 of the ejector 12 through conduits 150, 152 and 154. The refrigeration system 80 also includes a condensing region namely a fractionating condenser 156 having an inlet 158 for receiving the mixed refrigerant vapor and power vapor from the discharge portion 24 of the ejector 12, separating surfaces 160 for separating the refrigerant vapor from the power vapor by condensing the power vapor, a liquid outlet 162 and a vapor outlet 164. A conduit 166 is interconnected between the fractionating condenser 156 and the refrigerant condenser 52 for directing the refrigerant vapor and any dissolved power fluid from the fractionating condenser 156 to the refrigerant condenser 52. As shown, the discharge conduit 142 conveying refrigerant vapor and some dissolved power fluid from the ejector 82 interconnects with the conduit 166 so that such vapors are directed to the refrigerant condenser 52. On the other hand, the discharge conduit 140 leading from the ejector 82 is interconnected with the ejector 12 so as to direct the power vapor and some dissolved refrigerant from the ejector 82 to the power inlet 26 of the ejector 12. In order to return the condensed power vapor from the fractionating condenser 156 to the boiler 146 a conduit 168 is interconnected between the fractionating condenser 156 and the boiler 146. Depending upon the relative positioning of the fractionating condenser 156 with respect to the boiler 146 it may be necessary to provide a pump 170 for pumping the condensed power vapor to the boiler 146.

The operation of the apparatus of FIGS. 2 and 3 will now be described. Sufficient heat is applied to boiler 146 by means of the heat source 22 to effect a continuous vaporization of the power liquid 14 disposed within the boiler 146, to thereby produce a power vapor at the system's highest vapor pressure, $P_h$. This pressure must be sufficiently high so as to effectively operate the ejectors 82 and 12. The power vapor is directed to the power inlet 103 of the ejector 82 by means of the conduit 148. Ejectors 12 and 82, acting as pumps, effect a greatly reduced pressure in the conduits 150, 152 and 154 so that refrigerant vapor and any dissolved power fluid is withdrawn from the evaporator 30 at a pressure $P_1$ which is the saturation pressure of the refrigerant liquid 16 at the temperature prevailing within the evaporator 30. Evaporation at this reduced pressure $P_1$ keeps the evaporator 30 cold. As will be explained more fully hereinafter, some power fluid enters the evaporator 30 dissolved in the refrigerant liquid 16. Since the refrigerant liquid 16 has a lower boiling point than the power liquid, there usually remains in the evaporator 30 after the refrigerant liquid 16 has evaporated some liquid residue or contaminator liquid of higher boiling point which includes a large fraction of the power fluid. This contaminator liquid spills over into the overflow sump 60 from which it is delivered by gravity to the residue evaporator 62. Here the contaminator liquid is evaporated at a higher temperature than the temperature within the evaporator 30 by sensible heat from liquid within conduit 56. The combined vapor from both the evaporators 30 and 62 is induced to flow through the parallel connected conduits 152 and 154 to the respective refrigerant inlets 109 and 18 of the ejectors 82 and 12 by the action of the power vapor flowing through the ejector 82 and then in series through the ejector 12. In particular, referring to the ejector 82 the power vapor received from the boiler 146 through the inlet connection 102 enters the receiving end 116 of the power stream passageway 100 at a pressure considerably higher than the pressure existing in the discharge conduit 140. The power vapor is accelerated to a high velocity as it flows through the curved converging power stream passageway 100 where centrifugal force creates a pressure gradient and an energy gradient in the accelerated power vapor in direction transverse to the flow direction of the accelerated power vapor, so that the portion of the accelerated power vapor closest to the curved outer boundary surface 120 has the greatest total unit pressure energy and unit kinetic energy. On entering the curved accelerator compartment 104 the portion of the power vapor of greatest total unit pressure energy and unit kinetic energy flows continuously along the curved outer boundary surface 126 of the curved accelerator compartment 104 where centrifugal force maintains a pressure gradient in the accelerated power vapor within the curved accelerator compartment 104 in direction toward the curved outer boundary surface 126 of the curved accelerator compartment 104, with the greatest pressure at the curved outer boundary surface 126 which compresses the portion of the accelerated power vapor flowing along the curved outer boundary surface 126. The energy required for compressing this portion of the accelerated power vapor within the curved accelerator compartment 104 is drawn from the kinetic energy of that portion of the accelerated power vapor that is within the curved accelerator compartment 104 and farthest away from the curved outer boundary surface 126, thus reducing the velocity of that portion of the accelerated power vapor within the curved accelerator compartment 104 and farthest away from the curved outer boundary surface 126. Thus, an energy gradient is produced in the accelerated power vapor within the curved accelerator compartment 104 in direction toward the curved outer boundary surface 126 of the curved accelerator compartment 104, with the greatest energy at the curved outer boundary surface 126. Refrigerant vapor flows from the evaporator 30 through the inlet connection 108 and the secondary passageway 106 to the receiving end 122 of the curved accelerator compartment 104. The accelerated refrigerant vapor is directed by the secondary passageway 106 into the curved accelerator compartment 104 in such a way that the portion of the accelerated refrigerant vapor of greatest unit pressure energy and unit kinetic energy flows into contact with that portion of the accelerated power vapor within the curved accelerator compartment 104 of least total unit pressure energy and unit kinetic energy, where the refrigerant vapor is accelerated by contact with the power vapor and partially mixed therewith. However, mixing of the power vapor with the refrigerant vapor within the accelerator compartment 104 is held to a minimum by the centrifuging action within the accelerator compartment 104 due to the difference in densities between the power vapor and the refrigerant vapor. Even if the power vapor and the refrigerant vapor reach the same final velocity at the discharge end 124 of the accelerator compartment 104, the power vapor still has, because of its greater density, much greater kinetic energy per unit volume than the refrigerant vapor.

In operation, as the power vapor within the curved accelerator compartment 104 approaches the discharge end 124 of the curved accelerator compartment 104 where the curvature of the curved outer boundary surface 126 is less, the centrifugal force hereinbefore mentioned is relaxed as the centrifugal force is proportional to the curvature of the surface 126, and that portion of the power vapor flowing along and closest to the curved outer boundary surface 126 expands and in so doing transmits kinetic energy and momentum to that portion of the power vapor within the curved accelerator compartment 104 and farthest away from the curved outer boundary surface 126, and thus in turn transmits kinetic energy and momentum to the refrigerant vapor within the curved accelerator compartment 104 without shock and turbulence, to thereby accelerate the refrigerant vapor with high efficiency.

Due to the separating member 138 and the centrifugal action on the high density power fluid within the accelerator compartment 104, the power vapor is separated from the refrigerant vapor and the power vapor flows through the discharge passageway 139, where the kinetic energy of the power vapor is converted to pressure energy, and finally into the discharge conduit 140. At the same time the refrigerant vapor flows through the discharge passageway 141, where the kinetic energy of the refrigerant vapor is converted to pressure energy, and finally into the discharge conduit 142. By discharging the power vapor and the refrigerant vapor separately from the ejector 82 through the respective discharge passageways 139 and 141, the power vapor can retain sufficient energy to power the ejector 12.

The power vapor and any dissolved refrigerant flowing in the discharge conduit 140 flows into the power inlet 26 of the ejector 12 to pump and compress the refrigerant vapor received from the evaporator 30. The compressed refrigerant vapor is mixed with the power vapor in the discharge portion 24 of the ejector 12 and the vapor mixture is discharged from the discharge portion 24 at a pressure $P_2$ which is sufficient to condense the refrigerant vapor in the refrigerant condenser 52 at ambient temperature. On the other hand, the refrigerant vapor and any dissolved power fluid as a contaminator is guided directly by the conduits 142 and 166 to the refrigerant condenser 52 where such refrigerant vapor and contaminator power fluid is condensed.

The higher temperature vapor mixture discharged from the discharge portion 24 of the ejector 12 flows into contact with the separating surfaces 160 of the fractionating condenser 156 where the refrigerant vapor is separated from the power vapor by condensing the higher boiling point power vapor. The condensed power vapor and any dissolved refrigerant flows from the fractionating condenser 156 through the liquid outlet 162 and the conduit 168 to the boiler 146. The refrigerant vapor and any dissolved power fluid as a contaminator leaves the fractionating condenser 156 by way of the vapor outlet 164 and flows through the conduit 166 to the refrigerant condenser 52 where this vapor mixture is condensed. This condensed vapor mixture is at pressure $P_2$ which is higher than the pressure $P_1$ so that it will readily flow from the refrigerant condenser 52 through the conduit 56 to the evaporator 30. The hereinbefore cycle of operation is then repeated.

Figure 4:
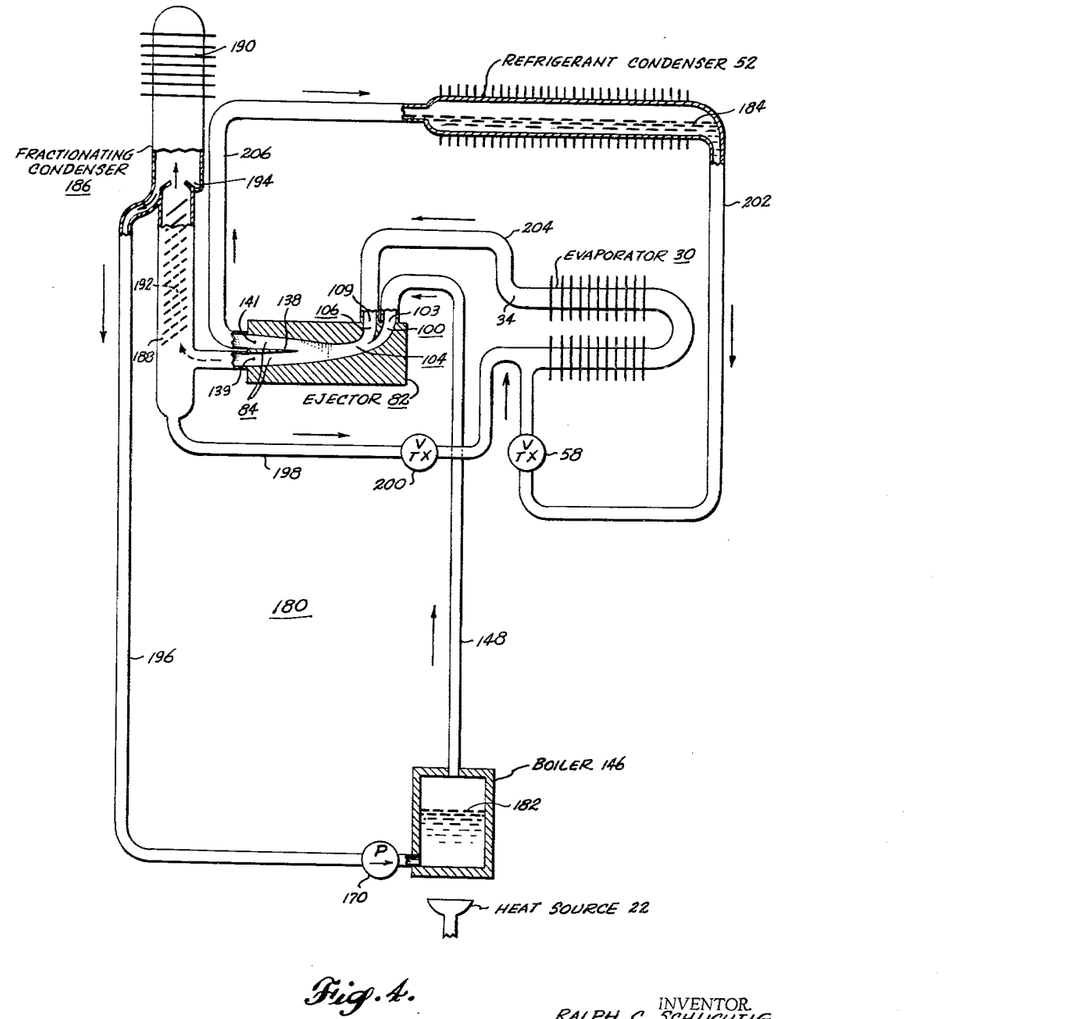
FIG. 4 is a flow diagram of a two fluid ejector type refrigeration system illustrating still another embodiment of the teachings of this invention in which a single ejector is used and the excess energy of the power fluid of relatively high molecular weight discharged from the ejector is in the form of pressure and temperature which is effectively utilized to maintain a better separation between the power fluid and refrigerant fluid so that the pressure ratio between the pressure in the refrigerant condenser and the pressure in the evaporator is decreased to thus increase the efficiency of the ejector and the efficiency of the overall refrigeration system, while maintaining the efficiency and advantage of a relatively denser power fluid than refrigerant fluid.

Referring to FIG. 4 there is shown a two fluid ejector type refrigeration system 180 illustrating another embodiment of the teachings of this invention in which the single ejector 82 is used and the excess energy of the power fluid discharged from the ejector 82 is in the form of pressure and temperature which is effectively utilized to maintain a better separation between the power fluid and the refrigerant fluid so that the pressure ratio between the pressure in the refrigerant condenser 52 and the pressure in the evaporator 30 is decreased, to thus increase the efficiency of the ejector 82 and the efficiency of the overall system 180. Like components of FIGS. 2 and 4 have been given the same reference characters.

In the embodiment of FIG. 4 the power liquid 182 has a greater molecular weight than the refrigerant liquid 184, however, the power liquid 182 has a lower boiling point than the refrigerant liquid 184. The refrigeration system 180 is such that it can employ a power liquid and a refrigerant liquid that are mutually miscible. However, the refrigeration system 180 is such that it can also operate with a power liquid and a refrigerant liquid that are only partially miscible. For example, a suitable power liquid and refrigerant liquid that are mutually miscible are cyclic-octofluorobutane and $CHCl_2F$, respectively. An example of a suitable power liquid and refrigerant liquid that are only partially miscible is cyclic-octofluorobutane and water, respectively. Of course, the same hereinbefore mentioned disadvantages occur when using a partially miscible power liquid and refrigerant liquid pair.

The refrigeration system 180 includes a fractionating condenser 186 which has two separate condensing regions 188 and 190, the condensing region 188 being a higher temperature region than the condensing region 190. Due to the greater density of the vapor mixture entering the fractionating condenser 186 from the ejector 82, as compared to the density of the vapor mixture entering the refrigerant condenser 52 from the ejector 82, the fractionating condenser 186 is a higher pressure condenser than the refrigerant condenser 52. Separating surfaces 192 are provided in the condensing region 188 for separating the power vapor from the refrigerant vapor by condensing the refrigerant vapor. The power vapor flows from the condensing region 188 to the ambient air cooled condensing region 190 where the power vapor and any dissolved refrigerant is condensed and flows into a collector 194. The condensed power vapor and any dissolved refrigerant is returned from the collector 194 to the boiler 146 through a conduit 196 by gravity or if need be by the action of the pump 170.

In order to return the condensed refrigerant and any dissolved power fluid to the evaporator 30, a conduit 198 is interconnected between the fractionating condenser 186 and the evaporator 30. A thermal regulating valve 200 is interposed in the conduit 198 to regulate in a well known manner the flow of liquid to the evaporator 30, as the pressure is greater in the fractionating condenser 186 than in the evaporator 30. As shown, a conduit 202 is interconnected between the refrigerant condenser 52 and the evaporator 30 in order to return the refrigerant liquid 184 and any dissolved power fluid from the refrigerant condenser 52 to the evaporator 30. The refrigerant vapor and any dissolved power fluid flows from the evaporator 30 to the refrigerant inlet 109 of the ejector 82 through a conduit 204. On the other hand, refrigerant vapor and dissolved power fluid flows from the discharge passageway 141 of the ejector 82 to the refrigerant condenser 52 through a discharge conduit 206.

The operation of the refrigeration system 180 will now be described. Heat is applied to the boiler 146 by means of the heat source 22 so as to effect a continuous vaporization of the power liquid 182 to thereby produce a power vapor at the systems highest vapor pressure, $P_h$. This pressure must be sufficiently high so as to operate the ejector 82. The power vapor is directed to the power inlet 103 of the ejector 82 by means of the conduit 148. Ejector 82, acting as a pump, effects a greatly reduced pressure in the conduit 204 so that the refrigerant vapor and any dissolved power fluid is withdrawn from the evaporator 30 at a pressure $P_1$, which is the saturation pressure of the refrigerant liquid 184 at the temperature prevailing within the evaporator 30. Evaporation at this reduced pressure $P_1$ keeps the evaporator 30 cold.

In operation, the refrigerant vapor and any dissolved power fluid is induced to flow from the evaporator 30 through the conduit 204 to the refrigerant inlet 109 and through the ejector 82 by the action of the power vapor flowing through the ejector 82 as hereinbefore described with reference to FIGS. 2 and 3. Power vapor and any dissolved refrigerant flows from the discharge passageway 139 of the ejector 82, at a pressure $P_3$, to the condensing region 188 of the fractionating condenser 186 and into contact with the separating surfaces 192 where the power vapor of lower boiling point is separated from the refrigerant vapor of higher boiling point by condensing the refrigerant vapor at a higher temperature than ambient. The heat given up by the condensing of the refrigerant vapor reevaporates most of the power vapor that is condensed within the condensing region 188 at a higher temperature than the condensing temperature within the ambient cooled condensing region 190 where the power vapor is condensed. The condenser power fluid and dissolved refrigerant flows into the collector 194. Thus, it can be realized that the excess energy of the power vapor of higher molecular weight discharged from the discharge passageway 139 of the ejector 82 in the form of pressure and temperature is sufficient to effect a separation of the power vapor from the refrigerant within the condensing region 188 by fractional distillation. This in conjunction with the ejector 82 permits a purer fraction of refrigerant vapor to be condensed within the refrigerant condenser 52. Therefore, the pressure ratio between the pressure $P_2$ in the refrigerant condenser and the pressure $P_1$ in the evaporator 30 is decreased, to thus increase the efficiency of the ejector 82 and the efficiency of the overall system 180.

The combination of the refrigerant liquid 184 and any dissolved power fluid which combination is at pressure $P_2$ which is greater than $P_1$ is returned to the evaporator 30 through the conduit 202 and the thermal regulating valve 58. Since any dissolved power fluid entering the evaporator 30 has a lower boiling point than the associated refrigerant liquid the dissolved power fluid evaporates off with the refrigerant and should not be considered a contaminator. In like manner, the separated refrigerant liquid at presure $P_3$ is returned from the fractionating condenser 186 to the lower pressure evaporator 30 through the conduit 198 and the thermal regulating valve 200. On the other hand, the power liquid and any dissolved refrigerant is returned from the collector 194 of the fractionating condenser 186 to the boiler 146 through the conduit 196. The hereinbefore described cycle of operation is then repeated.

It is to be understood that the combination of the low temperature boiler 68, the conduit 42 and the fractionating condenser 38 of FIG. 1 could be substituted for the fractionating condenser 156 of FIG. 2 so that the refrigeration system of FIG. 2 could effectively utilize the superheat of the vapor mixture discharged from the ejector 12. In addition, the refrigerant condenser 52 shown in FIGS. 1, 2 and 4 could be a water cooled condenser (not shown). Further, the refrigerant condenser 52 and the fractionating condenser 38 of FIG. 1 could be constructed as a single condenser (not shown) provided two separate condensing regions are used and means is incorporated for maintaining separation between the power liquid and the refrigerant liquid so they can be delivered to the boiler 68 and evaporator 30, respectively. In like manner, the refrigerant condenser 52 and the fractionating condenser 156 could be constructed as a single condenser (not shown) provided the same aforementioned restrictions are observed.

The apparatus embodying the teachings of this invention has several advantages. For instance, apparatus constructed in accordance with the teachings of this invention has a higher efficiency than other known heat powered heat pump systems. In addition, apparatus constructed in accordance with the teachings of this invention is capable of operating from a relatively small temperature difference between the heat source and the rejected heat at the condenser such as the difference in temperature between the temperature of ambient summer air and the temperature achievable by evaporating water into ambient air. Further, apparatus constructed in accordance with the teachings of this invention can satisfactorily operate with two diffferent working fluids that are miscible, noncorrosive, nonflammable and nontoxic such as fluorocarbon compounds. Also, the embodiment of FIG. 4 will satisfactorily operate with a power fluid that has a lower boiling point than the refrigerant. Also, in apparatus constructed in accordance with this invention the excess energy of the power fluid discharged from an ejector is effectively utilized in the system.

Since certain changes may be made in the above described apparatus and different embodiments of the invention may be made without departing from the spirit and scope thereof, it is intended that all matter contained in the above description or shown in the accompanying drawings shall be interpreted as illustrative and not in a limiting sense.

I claim as my invention:

1. In a heat transfer system for using as working mediums a power fluid comprising a fluid of a given molecular weight and a refrigerant comprising a fluid of relatively lower molecular weight in which the refrigerant fluid is at least partially miscible with the power fluid, the combination comprising, ejector pump means having a power inlet, refrigerant inlet means and discharge means; means for vaporizing the power fluid and for directing the vaporized power fluid to the power inlet of said ejector pump means; first evaporator means for evaporating the refrigerant to a vapor and for discharging therefrom a contaminator fluid– residue evaporator means operatively associated with said first evaporator means for evaporating the contaminator fluid discharged from said first evaporator means to a vapor and for effecting in cooperation with said ejector pump means a flow of the refrigerant vapor and the vaporized contaminator fluid to the refrigerant inlet means of said ejector pump means; a first condensing region and a second condensing region; means operatively associated with the discharge means of said ejector pump means for separating the vaporized power fluid from the refrigerant vapor and the vaporized contaminator fluid by condensing the vaporized power fluid at said first condensing region and for directing the separated refrigerant vapor and vaporized contaminator fluid to said second condensing region for condensing; and means for returning the condensed refrigerant and contaminator fluid to said first evaporating means and for returning the condensed power fluid to said vaporizing means.

2. In a heat transfer system for using as working mediums a power fluid comprising a fluid of a given molecular weight and a given boiling point and a refrigerant comprising a fluid of relatively lower molecular weight and relatively lower boiling point in which the refrigerant fluid is at least partially miscible with the power fluid, the combination comprising, an ejector pump having a power inlet, a refrigerant inlet and a discharge portion; boiler means including means for vaporizing the power fluid and for directing the vaporized power fluid to the power inlet of said ejector pump; first evaporator means for evaporating the refrigerant to a vapor and for discharging therefrom a contaminator fluid; residue evaporator means operatively associated with said first evaporator means for evaporating the contaminator fluid discharged from said first evaporator means to a vapor and for effecting in cooperation with said ejector pump a flow of the refrigerant vapor and the vaporized contaminator fluid to the refrigerant inlet of said ejector pump so that the vaporized power fluid and the refrigerant vapor and the vaporized contaminator fluid flow through said ejector pump with the vaporized power fluid discharging from the discharge portion of said ejector pump with excess energy in the form of heat energy; energy recovery operatively associated with said boiler means and with the discharge portion of said ejetcor pump for receiving the vaporized power fluid, the refrigerant vapor and the vaporized contaminator fluid from the discharge portion of said ejector pump so as to recover and effectively utilize the excess energy of the vaporized power fluid discharged from said ejector pump in the form of heat energy in vaporizing any of the low boiling point refrigerant fluid dissolved in the higher boiling point power fluid associated with said boiler means; a first condensing region and a second condensing region; means operatively associated with said energy recovery means for receiving the vaporized power fluid, the refrigerant vapor and the vaporized contaminator fluid from said energy recovery means so as to separate the vaporized power fluid from the refrigerant vapor and the vaporized contaminator fluid by condensing the vaporized power fluid at said first condensing region and for directing the separated refrigerant vapor and vaporized contaminator fluid to said second condensing region for condensing; and means for returning the condensed refrigerant and contaminator fluid to said first evaporating means and for returning the condensed power fluid and any low boiling point refrigerant fluid dissolved in the power fluid to said boiler means.

3. In a heat transfer system for using as working mediums a power fluid comprising a fluid of a given molecular weight and a refrigerant comprising a fluid of relatively lower molecular weight in which the refrigerant fluid is at least partially miscible with the power fluid, the combination comprising, first ejector pump means having an accelerator compartment, a power inlet, a refrigerant inlet and a discharge portion; means for vaporizing the power fluid and for directing the vaporized power fluid to the power inlet of said first ejector pump means; second ejector pump means having a power inlet, a refrigerant inlet and a discharge portion; means for evaporating the refrigerant to a vapor aid for effecting in cooperation with said first ejector pump means and with second ejector pump means a flow of a first portion of the refrigerant vapor to the refrigerant inlet of said first ejector pump means and a flow of another portion of the refrigerant vapor to the refrigerant inlet of said second ejector pump means so that said first portion of the refrigerant vapor and the vaporized power fluid flow through the accelerator compartment of said first ejector pump means for separating vaporized power fluid of excess energy; discharge and separating means operatively associated with the discharge portion of said first ejector pump means for separating vaporized power fluid of excess energy flowing through the accelerator compartment of said first ejector pump means from said first portion of the refrigerant vapor and for directing the separated vaporized power fluid of excess energy to the power inlet of said second ejector pump means where said excess energy is effectively utilized; a first condensing region and a second condensing region; means operatively associated with said discharge and separating means and with the discharge portion of said second ejector pump means for receiving said first portion of the refrigerant vapor from said first ejector pump means and the separated vaporized power fluid and said another portion of the refrigerant vapor from said second ejector pump means for separating the separated vaporized power fluid from said first portion of the refrigerant vapor and from said another portion of the refrigerant vapor by condensing the separated vaporized power fluid at said first condensing region and for directing the separated refrigerant vapor to said second condensing region for condensing; and means for returning the condensed refrigerant to said evaporating means and for returning the condensed power fluid to said vaporizing means.

4. The heat transfer system of claim 3 in which the accelerator compartment of said first ejector pump means is so constructed that due to the centrifugal action on the vaporized power fluid within said accelerator compartment and due to said discharge and separating means vaporized power fluid of excess energy flowing through said first ejector pump means is separated from said first portion of the refrigerant vapor.

5. In a heat transfer system for using as working mediums a power fluid comprising a fluid of a given molecular weight and a refrigerant comprising a fluid of relatively lower molecular weight in which the refrigerant fluid is at least partially miscible with the power fluid, the combination comprising, first ejector pump means having an accelerator compartment, a power inlet, a refrigerant inlet, and a discharge portion; means for vaporizing the power fluid and for directing the vaporized power fluid to the power inlet of said first ejector pump means; second ejector pump means having a power inlet, a refrigerant inlet and a discharge portion; first evaporator means for evaporating the refrigerant to a vapor and for discharging therefrom a contaminator fluid; residue evaporator means operatively associated with said first evaporator means for evaporating the contaminator fluid discharged from said first evaporator means to a vapor and for effecting in cooperation with said first ejector pump means and with said second ejector pump means a flow of a first portion of the refrigerant vapor and the vaporized contaminator fluid to the refrigerant inlet of said first ejector pump means and a flow of another portion of the refrigerant vapor and the vaporized contaminator fluid to the refrigerant inlet of said second ejector pump means so that the vaporized power fluid and said first portion of the refrigerant vapor and vaporized contaminator fluid flow through the accelerator compartment of said first ejector pump means with the vaporized power fluid having excess energy; discharge and separating means operatively associated with the discharge portion of said first ejector pump means for separating vaporized power fluid of excess energy flowing through the accelerator compartment of said first ejector pump means from said first portion of the refrigerant vapor and vaporized contaminator fluid and for directing the separated vaporized power fluid of excess energy to the power inlet of said second ejector pump means where said excess energy is effectively utilized; a first condensing region and a second condensing region; means operatively associated with said discharge and separating means and with the discharge portion of said second ejector pump means for receiving said first portion of the refrigerant vapor and vaporized contaminator fluid from said first ejector pump means and the separated vaporized power fluid and said another portion of the refrigerant vapor and vaporized contaminator fluid from said second ejector pump means for separating the separated vaporized power fluid from said first portion of the refrigerant vapor and vaporized contaminator fluid and from said another portion of the refrigerant vapor and vaporized contaminator fluid by condensing the separated vaporized power fluid at said first condensing region and for directing the separated refrigerant vapor and vaporized contaminator fluid to said second condensing region for condensing; and means for returning the condensed refrigerant and contaminator fluid to said first evaporating means and for returning the condensed power fluid to said vaporizing means.

6. In a heat transfer system for using as working mediums a power fluid comprising a fluid of a given molecular weight and a given boiling point and a refrigerant comprising a fluid of relatively lower molecular weight and relatively lower boiling point in which the refrigerant fluid is at least partially miscible with the power fluid, the combination comprising, ejector pump means having power inlet means, refrigerant inlet means and discharge means; boiler means including means for vaporizing the power fluid and for directing the vaporized power fluid to the power inlet means of said ejector pump means; an evaporator for evaporating the refrigerant to a vapor and for effecting in cooperation with said ejector pump means a flow of the refrigerant vapor to the refrigerant inlet means of said ejector pump means so that the vaporized power fluid and the refrigerant vapor flow through said ejector pump means with the vaporized power fluid discharging from the discharge means of said ejector pump means with execss energy in the form of heat energy; energy recovery means operatively associated with said boiler means and with the discharge means of said ejector pump means for receiving the vaporized power fluid and the refrigerant vapor from the discharge means of said ejector pump means so as to recover and effectively utilize the excess energy of the vaporized power fluid discharged from said ejector pump means in the form of heat energy in vaporizing any of the low boiling point refrigerant fluid dissolved in the higher boiling point power fluid associated with said boiler means; a first condensing region and a second condensing region; means operatively associated with said energy recovery means for receiving the vaporized power fluid and the refrigerant vapor from said energy recovery means so as to separate the vaporized power fluid from the refrigerant vapor by condensing the vaporized power fluid at said first condensing region and for directing the separated refrigerant vapor to said second condensing region for condensing; and means for returning the condensed refrigerant to said evaporator and for returning the condensed power fluid and any low boiling point refrigerant fluid dissolved in the power fluid to said boiler means.

References Cited by the Examiner

UNITED STATES PATENTS

| 1,716,762 | 6/30 | Whitney | 62—500 |
| 2,014,701 | 9/35 | Seligmann | 62—500 |
| 2,174,301 | 9/39 | Whitney | 62—500 |
| 2,411,186 | 11/46 | Boeckeler | 62—500 |
| 2,931,190 | 11/60 | Dubitzley | 62—502 |

ROBERT A. O'LEARY, *Primary Examiner.*

MEYER PERLIN, *Examiner.*